United States Patent [19]
Baker

[11] 3,802,125
[45] Apr. 9, 1974

[54] THREE TRACK SLIDING AIRCRAFT DOOR

[75] Inventor: Irwin G. Baker, Bellevue, Wash.

[73] Assignee: The Boeing Company, Seattle, Wash.

[22] Filed: Apr. 28, 1972

[21] Appl. No.: 248,553

[52] U.S. Cl........................... 49/360, 49/40, 49/215
[51] Int. Cl.............................................. E05f 11/48
[58] Field of Search...... 49/209, 210, 213, 215–217, 49/221–225, 360–363, 199, 203, 40, 309, 347

[56] References Cited
UNITED STATES PATENTS

| | | | |
|---|---|---|---|
| 3,585,757 | 6/1971 | Ritchie.................................. | 49/40 |
| 3,444,650 | 5/1969 | Flinchbaugh ........................ | 49/360 |
| 3,440,762 | 4/1969 | Olsson ................................. | 49/209 |
| 2,187,095 | 1/1940 | Piper.................................... | 49/210 |
| 647,930 | 4/1900 | Arschaouloff ...................... | 49/210 |

Primary Examiner—Kenneth Downey
Attorney, Agent, or Firm—Christensen, O'Connor, Garrison & Havelka

[57] ABSTRACT

An aircraft door of the plug type is mounted on three tracks affixed to an airframe for inward and upward movement to open the door. A pressure seal is provided. The door is powered for upward movement by a link chain connected to an arm on which the door is suspended in one of the tracks. Two of the tracks are mounted adjacent the sides of the door while a third track is mounted above the door and centrally located with respect to the door opening. A positive latching mechanism is also provided to retain the door in a closed position.

13 Claims, 6 Drawing Figures

PATENTED APR 9 1974

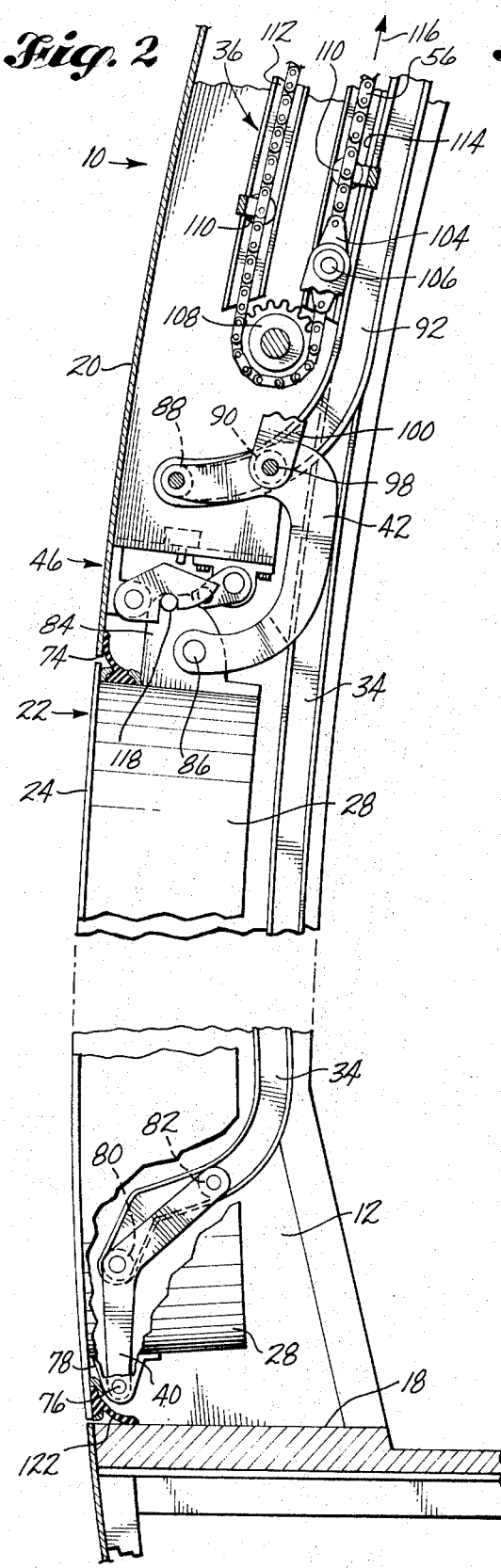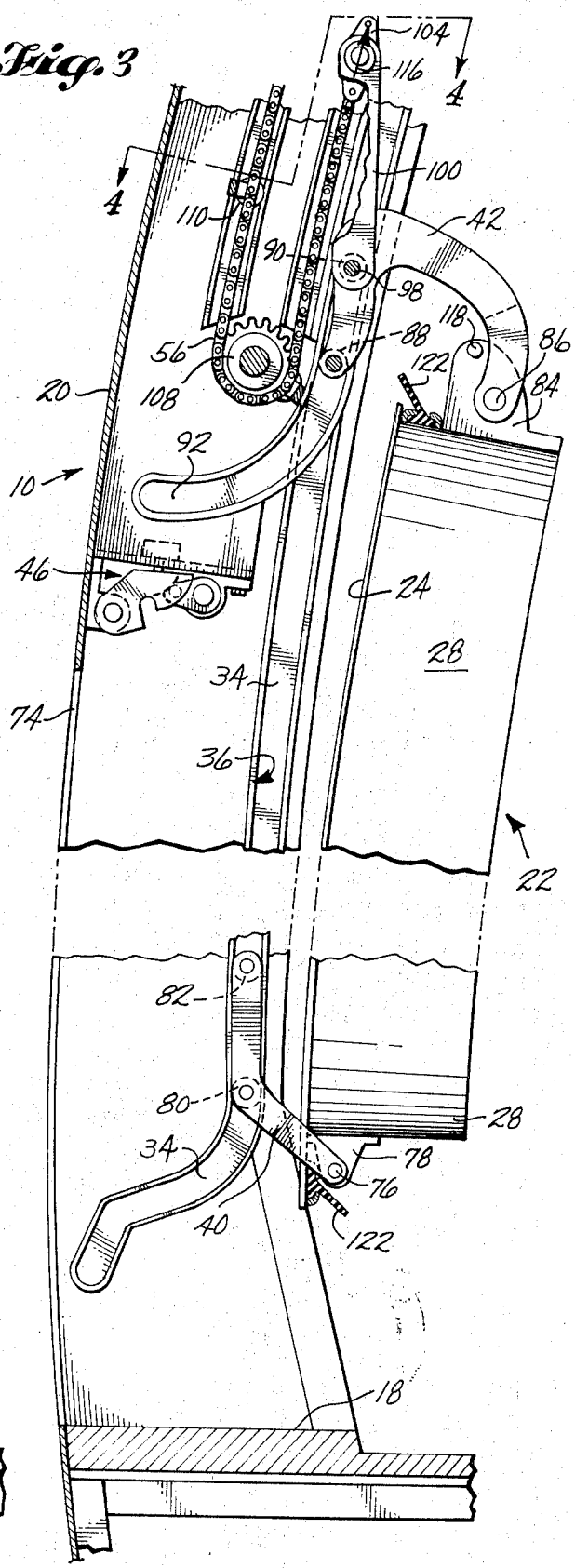

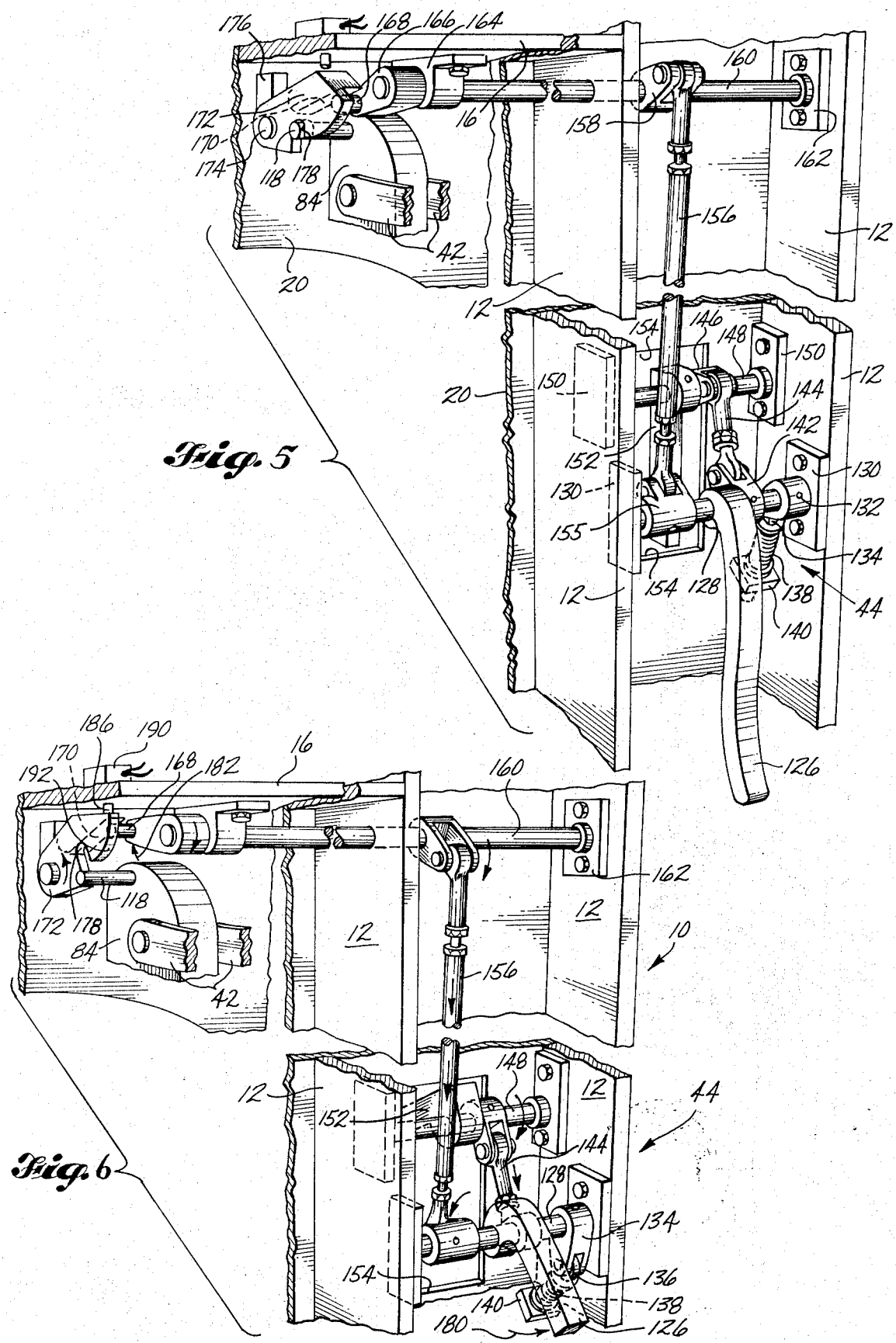

THREE TRACK SLIDING AIRCRAFT DOOR

DESCRIPTION OF THE PRIOR ART

This invention relates generally to aircraft doors and particularly to an overhead sliding door mounted on three tracks.

Many commercial aircraft door closure systems today require seals since the passenger cabin is pressurized. Many problems are encountered in providing an adequate seal mechanism as well as a door which will withstand the internal pressure forces generated as the cabin is pressurized while altitude is gained. Doors generally referred to as plug type are conveniently utilized for passenger aircraft cabin doors. The plug type door is one which operates to close from the inside against a pressure seal and is also restrained from blowout by positive stops coacting between the airframe and the door.

Simple inwardly opening outwardly closing doors of the plug type are not efficiently used on commercial aircraft since space within the passenger cabin is at a premium. As a result plug type doors have been developed which initially open inwardly but thereafter fold so that they may be passed through the opening without encountering their stops mentioned above and may be swung outwardly out of the way of the access opening. Such door systems require relatively complex hinge mechanisms and associated latches which are difficult and expensive to manufacture.

It is an object of the present invention to provide a one piece door which opens inwardly but which does not swing laterally interior of the passenger cabin. It is a further object of the present invention to provide a relatively inexpensive aircraft door. It is a further object of the present invention to provide an aircraft door which includes relatively simple operating mechanism while providing the features of installed adjustability and ease of manufacture. It is a further object of the present invention to provide an aircraft door which will move inwardly from the opening in the airframe and will move upwardly overhead for open storage and which does not utilize valuable space within the passenger cabin. It is a further object of the present invention to provide a positive latching means for a door of the desired type.

It is a further object of the present invention to provide a door which slides overhead on a plurality of tracks. It is a further object of the present invention to provide a door which will remain operable even though the airframe and door become misaligned due to original manufacture or due to twisting or damaging of the airframe on which the tracks are mounted. It is a further object of the present invention to provide an overhead door which is normally raised and lowered by power requiring little or no assistance from the operator of the door. It is a further object of the present invention to provide a door onto which an escape slide can easily be attached. It is a further object of the present invention to provide a door which is a lightweight and has a simple structure. It is a further object of the present invention to provide a door which can be replaced at a relatively low cost and which is interchangeable among aircraft and among openings in an airframe.

It is furthermore an object of the present invention to provide a door assembly which is easily susceptible to numerically controlled machining and assembly. It is a further object of the present invention to provide an aircraft door assembly which does not require close tolerance manufacture for installation and manufacture.

SUMMARY OF THE INVENTION

The present invention provides a three track, aircraft door mounting structure in combination with an airframe wall structure and an aircraft door. The airframe wall structure has an outer skin which has an access opening therethrough. Wall structural members are located adjacent the sides of and above the opening and are located interior of the outer skin. The door has an outer surface adapted to register with the opening in the outer skin. A first track is located adjacent one side of the opening and interior of the outer skin and is mounted on one of the structural members. A second track is located adjacent the opposite side of the opening and interior of the outer skin and is mounted on another of the structural members. The first and second tracks run from adjacent the bottom of the openings to adjacent the top of the opening. A third track, having one end thereof located centrally above and adjacent the opening and interior of said outer skin, is mounted on another of the structural members located above said opening. The third track runs upwardly from adjacent the top of the opening to a spaced distance above the opening. All of the tracks have first lower guide portions adjacent the outer skin, second inwardly and upwardly directed guide portions connected to the first guide portions, and third upwardly directed elongate guide portions connected to the second guide portions. First and second follower means are connected to the lower portion of said door for sliding engagement with the guide portions of the respective first and second tracks. A third follower means is connected to the upper portion of the door for sliding engagement with the guide portions of the third track. The door is thereby substantially supported at three locations by the follower means. The follower means cooperate when resting in the first guide portions of said tracks to register the door with the opening. The follower means cooperate when traversing the second guide portions of the tracks to guide and support the door for upward movement and for movement inwardly relative to the outer skin. The follower means cooperate when traversing said third guide portions of the tracks to guide and support the door for upward movement to a position above the opening. A means is also provided for moving the door between the position in registration with the opening and the position above the opening.

BRIEF DESCRIPTION OF THE DRAWINGS

A better understanding of the present invention can be acquired by a reading of the ensuing specification in conjunction with the accompanying drawings wherein:

FIG. 2 is a shortened cross-sectional view of the upper and lower tracks in which the door of the present invention rides and showing the drive chain mechanism;

FIG. 3 is a cross-sectional view in elevation similar to that of FIG. 2 showing the door in a partially raised position;

FIG. 5 is an isometric view of the latch assembly of the present invention showing the assembly in a closed and engaged position;

FIG. 6 is an isometric view of the latch assembly similar to FIG. 5 showing the assembly in an open and disengaged position.

DESCRIPTION OF PREFERRED EMBODIMENT

Figure 1:
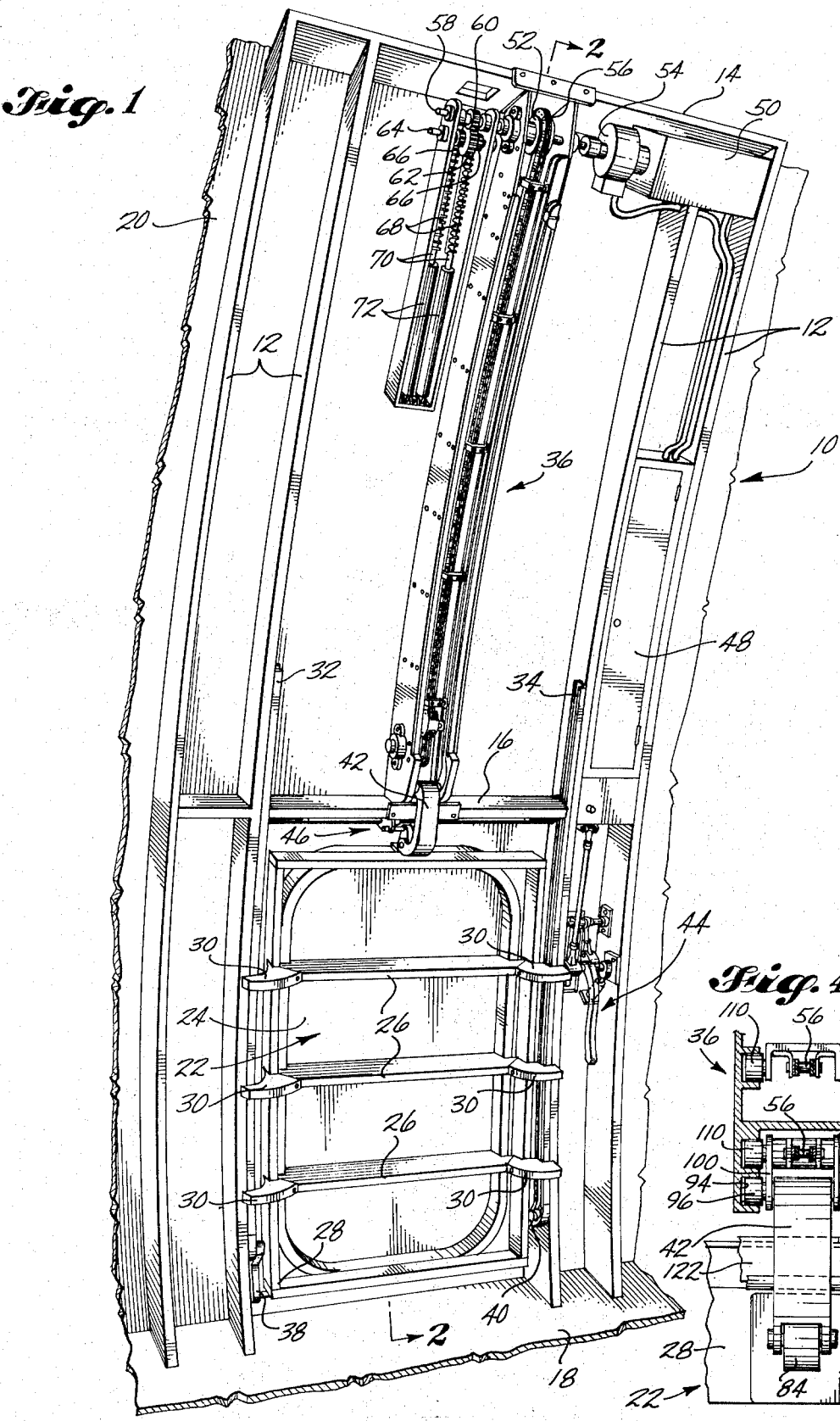
FIG. 1 is an isometric view of the door assembly of the present invention mounted in an airframe in a closed position.

Referring first to FIG. 1 an airframe 10 is illustrated with suitable vertical structural members 12 and horizontal structural members 14 and 16. The floor 18 of, for example, a passenger cabin in the aircraft connects to the vertical structural members 12. An outer skin 20 is suitably fastened to the structural members 12, 14, 16 and the periphery of the floor 18. A door 22 registers with an opening in the outer skin 20, better seen in latter FIGURES. The opening is conveniently located between the horizontal structural member 16 and the floor 18.

The door 22 can be manufactured with a conventional structure such as the frame shown which includes the outer skin 24 of the door, cross braces 26 and peripheral frame 28. Connected to the cross brace members are a plurality of stops 30 which abut against the inner side of the inner vertical structural members 12 when the door 22 is in a closed position. The exterior side of the outer skin 24 rests flush with the outer skin 20 of the airframe 10 when the door 22 is in a closed position. Alternatively, the door of the present invention is readily adaptable to construction from honeycomb material. If this alternative were used, the outer skin 24 could be fastened directly to the honeycomb structure, eliminating all braces and stops except the peripheral brace 28, which would act as a continuous stop on the sides of the door 22.

The door 22 is carried in a left track 32 and a right track 34 and an upper track assembly, generally designated 36. Lower arms 38 and 40 are pivotally connected to the lower portion of the door frame and carry suitable followers described in detail later which ride in the left and right tracks 32 and 34, respectively. Another arm 42 is pivotally connected to the center top portion of the door 22. Arm 42 carries appropriate followers which ride in the track assembly 36.

In operation the latch actuating assembly, generally designated 44, is moved from an indicated closed position to an indicated open position. Actuation of the latch actuating assembly 44 unlatches a mechanical latch assembly 46 and simultaneously, through appropriate switching a circuitry housed in cabinet 48, actuates an electric motor 50. Electric motor 50 drives a sprocket 52 through a magnetic clutch assembly 54. The sprocket 52 drives chain 56 which in turn raises the latch arm 42 and causes it to move upwardly along the track assembly 36. The operation of this portion of the invention will be described in greater detail later. The door is thus raised from its closed position as shown vertically along the tracks 32, 34 and the track assembly 36 to a position slightly inside and above the door opening in the airframe 10.

As can be seen in FIG. 1, sprocket 52 is carried on a shaft 58 containing a spur gear 60. Spur gear 60 mates with a second spur gear 62 mounted on shaft 64. Shaft 64 contains a set of pinions 66 which engage racks 68. Racks 68 are connected to the piston arm 70 of a pair of compressed gas cylinders 72. Such compressed gas cylinders 72 are known in the art and are utilized in automotive and aircraft applications. The compressed gas cylinder 72 bias the rack 68 in an upward direction. Thus the spur gear 62 mating with spur gear 60 is torqued in a direction which will counterbalance the door 22 in an upward position. This counterbalance is provided to reduce the power requirements of the electric motor 50 and furthermore will assist in manual raising of the door should the latter become necessary as when a power failure occurs.

Since the present invention as disclosed herein is directed primarily to the mechanical aspects of the overhead door, only those electrical components sufficient to provide a basic understanding of powered actuation of the door have been disclosed. It is to be understood that any suitable switching mechanism, electric motor and the like can be interconnected with the system as disclosed herein to effect powered raising of the door 22 in the tracks 32, 34 and track assembly 36.

Referring now to FIGS. 2 and 3, the operation of the tracks and door carriers and track assembly will be illustrated and explained in detail. The partial sectional view of FIGS. 2 and 3 is broken through the middle and compressed to conserve space. The sectional view is taken essentially along a vertical plane through the interior side of the track assembly 36 along a line similar to section line 2—2 of FIG. 1.

Referring to FIG. 2 in detail the outer skin 24 of door 22 registers flush with the outer skin 20 to plug the opening 74 in the airframe 10. The right track 34 is firmly affixed to one of the vertical structural members 12. Arm 40 is pivotally connected by pin 76 to the bracket 78 connected to the bottom of peripheral frame 28 of the door 22. Arm 40 carries a pair of spaced followers 80 and 82 which are journaled on shafts connected to the arm 40. Arm 38 (FIG. 1) is constructed similarly to arm 40.

Upper arm 42 is pivotally connected by pin 86 to bracket 84 attached to the upper portion of peripheral frame 28. Arm 42 carries a pair of followers 88 and 90 spaced from each other on the upper portion of arm 42. The followers 88 and 90 are appropriately journaled on the arm 42 and rest in a guideway of the track 92. It will be understood that track 92 forms a part of the track assembly 36 (FIG. 1). There exists a right track 92 and a mirror image left track 94 (better shown in FIG. 4). A link 100 is pivotally connected to arm 42 by the same pin 98 on which the follower 90 is journaled. The link 100 hides a second link 102 (FIG. 4) which is connected to the opposite side of pin 98. Links 100 and 102 are pivotally connected to a chain link 104 by pin 106. Link 104 in turn forms part of continuous link chain 56. Link chain 56 mates with the idler sprocket 108 at the bottom of the track assembly 36. Additional followers 110 are spaced along the length of the chain 56 and ride in the guideways 112 and 114. The coaction of these followers 110 and the guideways 112 and 114 maintain the chain spacing from the remainder of the track assembly 36 as it conforms to the contour of the airframe 10.

Referencing from FIG. 2 to FIG. 3 as the chain is driven in the direction of arrow 116, link 104 is drawn upwardly lifting along with it the arm 42. Likewise, since arm 42 is connected to the door frame 28 the door is raised upwardly. Since both of the followers 88 and 90 must ride in the track 92, the arm 42 is swung inwardly in an arcuate path to move the door 22 inwardly. Thus the door 22 can clear the interior portion of the airframe 10 as it travels upwardly in its path as guided along track assembly 36.

Figure 4:
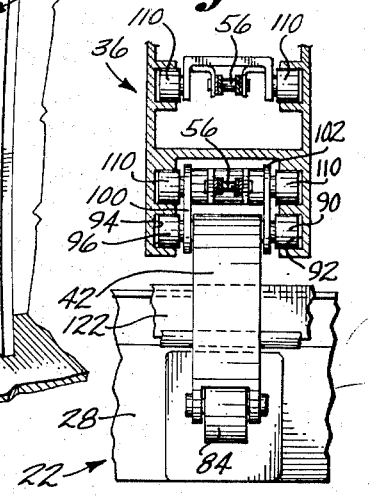
FIG. 4 is a staggered cross-sectional view of the upper track and drive mechanism taken along a section line similar to 4—4 of FIG. 3.

FIG. 4 is a cross-sectional view of FIG. 3 taken along section line 4—4 illustrating the construction of track assembly 36. As shown the follower 90 rides in track 92 while a second follower 96 also journaled on pin 98 rides in an opposing track 94. Similarly guideways are provided for the followers 110 so that the chain 56 will conform to the airframe curvature as it traverses its closed path.

As will be explained in detail later, prior to actuation of the chain 56 in the direction of arrow 116, the latch mechanism 46 (FIG. 1) must be unlocked to free pin 118 also connected to the bracket 84. As shown in FIG. 3 the latch assembly 46 has released pin 118 and is held in its released position.

Referring to the bottom portion of the door 22 as the chain 56 is raised in the direction of arrow 116, followers 82 and 80 will cause the pin 76 connected to arm 40 to follow an arucate path moving the door 22 inwardly and upwardly as the followers 82 and 80 traverse the track 34. The bottom portion of the door 22 follows generally the same path as it is raised as does the top of the door 22.

An effective pressure seal is provided by a continuous seal member 122 connected to the peripheral frame 28. Seal member 122 extends outwardly at its upper end past the outer skin 24 of the door 22. Near the bottom corners of the door the seal rotates such that across the bottom of the door the sealing surface of the seal member 122 is directed inwardly. Thus as can be seen by referring back to FIG. 2 the bottom portion of the seal 122 contacts the floor 18 of the airframe, whereas the upper portion of the seal member 122 contacts the outer skin 20 of the airframe. This seal construction can be utilized in conjunction with an appropriate mating surface on the airframe. Other seal configuration can be utilized if desired.

Referring to FIGS. 5 and 6 the detail of the latch actuating mechanism generally designated 44 in FIG. 1 is illustrated. The actuating mechanism 44 includes a handle 126 connected to a shaft 128. Shaft 128 is journaled in bearing blocks 130 which in turn are connected by suitable fasteners to the vertical structural members 12. A first crank 132 is securely fastened to shaft 128 and is pivotally connected at its other end to a rod 134 which extends through the center of a coil compression spring at 138. The top portion of the coil spring 138 bears against the crank 132 in a camming action to bias the crank 132 toward a closed position as shown in FIG. 5. The spring is held in compression against a bracket 140 pivotally affixed to the vertical structural member 12. A second crank 142 is also firmly affixed to the shaft 128. A connecting link 144 pivotally connects to a crank 146 in turn firmly affixed to a shaft 148. Shaft 148 is journaled at each of its ends in bearing blocks 150 in turn affixed to vertical structural members 12 by suitable fasteners. Also connected to the shaft 148 is a handle 152 which in the closed position mates with an opening 154 in the outer skin 20 of the airframe. Handle 152 serves an actuating handle from the exterior of the airframe whereas handle 126 functions to actuate the mechanism 44 from interior of the airframe.

A third crank 155 firmly affixed to shaft 128 is pivotally connected to connecting link 156 which extends upwardly toward shaft 160. The upper end of connecting link 156 is pivotally connected to crank 158 which in turn is firmly affixed to shaft 160. Shaft 160 is journaled at one end in bearing holder 162 firmly affixed to one of the vertical structural members 12 by suitable fasteners. Shaft 160 extends through an appropriate aperture in the other vertical structural member 12, and is journaled in a bearing 164 affixed to the bottom of the horizontal structural member 16 by suitable fasteners. The shaft 160 extends beyond the bearing 164 and is firmly affixed to a crank 166. A camming pin 168 is connected to the outer end of crank 166. Camming pin 168 mates with a cam surface 170 on latch member 172. Latch member 172 is journaled on pin 174 which is in turn connected by the bracket 176 to the outer skin 20 of the airframe.

As described in conjunction with FIGS. 2 and 3, the latch member 172 by means of the slot 178 retains the pin 118 connected to bracket 84 in a fixed position. In this position bracket 84 holds the door 22 (not shown in this FIGURE) in a closed position.

As shown in FIG. 6 when the handle 126 is rotated in the direction of arrow 180 connecting link 144 is moved downwardly torquing the shaft 148 in the direction shown. This will cause the exterior handle 152 to protrude from the exterior of the aircraft. Likewise the handle 152 can be grasped from the exterior of the airframe 10 so that the latch actuating mechanism 44 can be manipulated from the outside. Simultaneously the connecting link 156 is moved downwardly which in turn torques the shaft 160 in the direction shown. As this occurs, the camming pin 168 is moved in the direction of arrow 182. By coaction with the cam surface 170 the latch member 172 is rotated in an upward direction releasing the retention pin 118. Thus the bracket 84 is free to move or to be moved by the force exerted on arm 42. Simultaneously the top portion of latch member 172 bears against a switch pin 186. A switch 190 is situated above the switch pin 186 on the top of horizontal structural member 16. Switch 190 can serve a variety of purposes, for example, it can actuate the lift motor 50 (FIG. 1). In addition, the switch can give an indication that the door is in an open position.

In reverse when the actuating handle 126 is returned to its closed position by actuation of the various linkages, the camming pin 168 is moved in the direction opposite to arrow 182 (FIG. 6). The latch member 172 is thus allowed to drop to its rest position as shown in FIG. 5. When the bracket 84 with latch pin 118 thereon moves into place as the door 22 registers with the opening in the airframe, the latch pin 118 will contact the forward curved surface 192 of the latch member 172 pushing it momentarily upward. As the latch pin 118 moves into position the latch 172 will drop down on the latch pin 118, securing the latch pin 118 in the slot 194 of the latch member.

As seen in FIG. 6 when the handle 126 is in an open position, the crank 132 passes beyond the center line between the bracket 140 and the shaft 128. As it passes through this center line it compresses the coil spring 138. The force of the coil spring 138 on the crank 132 will thus bias the handle 126 in an opening position. As shown in FIG. 5, the crank 132 is on the other side of the center line. Thus the coil spring 138 biases the handle 126 in a closed position.

Although the present invention has been described in relation to a preferred embodiment it is understood that one of ordinary skill in the art could make various modifications, changes, substitutions of equivalents and other alterations to the invention as disclosed without departing from the original concept. For example, various other door stop mechanisms could be utilized. In addition, escape slide or escape raft attachments can be employed with the present latch assembly 44. For example an escape slide can be attached to the frame members 26 of the door 22. Actuation mechanism can be located below the floor 18 and can be actuated by connecting links attached to for example the shaft 128.

It is intended therefore that the invention as disclosed be limited only by the definition contained in the appended claims.

What is claimed is:

1. In combination, an airframe wall structure having an outer skin, said outer skin having an opening therethrough, wall structural members located adjacent the sides of and above said opening interior of said outer skin, a door having an outer surface adapted to register with said opening in said outer skin, and means for opening and closing said door comprising: a first track located adjacent one side of said opening and interior of said outer skin and mounted on one of said structural members, a second track located adjacent the opposite side of said opening and interior of said outer skin and mounted on another of said structural members, said first and second tracks running from adjacent the bottom of said opening to adjacent the top of said opening, a third track having one end thereof located centrally above and adjacent said opening and interior of said outer skin and mounted on another of said structural members located above said opening, said third track running upwardly from adjacent said opening to a spaced distance above said opening, said tracks having first lower guide portions adjacent the outer skin, second inwardly and upwardly directed guide portions connected to said first guide portions, and third upwardly directed elongate guide portions connected to said second guide portions, first and second follower means connected to the lower portion of said door for sliding engagement with the guide portions of the respective first and second tracks, third follower means connected to the upper portion of said door for sliding engagement with the guide portions of said third track, said door thereby substantially supported at three locations by said follower means, said follower means when resting in said first guide portions of said tracks cooperating to register said door with said opening, said follower means cooperating when traversing said second guide portions of said tracks to guide and support said door for upward movement and for movement inwardly relative to said outer skin, said follower means cooperating when traversing said third guide portions of said tracks to guide and support said door for upward movement to a position above said opening, and means for moving said door between a position in registration with said opening and a position above said opening.

2. The combination of claim 1 where said first, second and third follower means each comprise an arm pivotally mounted to said door, each of said arms having spaced roller members mounted thereon for respective engagement with the guide portions of said first, second and third tracks.

3. The combination of claim 2 wherein said means for moving said door comprises an elongate continuous flexible member mounted for movement about a set of guide wheels, one of said guide wheels being an idler wheel and another of said guide wheels being a driven wheel, said continuous flexible member and said guide wheels located adjacent to and aligned beside said third track, motor means for rotatably driving said driven wheel, and means coupling a portion of said flexible member and said third follower means, whereby movement of said flexible member will cause said third follower means to traverse said third track and thereby open and close said door.

4. In combination, a closure member for an opening in a wall of an airframe, said opening having sides, a first end and a second end, comprising:

first and second guide means mounted on said wall on opposite sides of and adjacent said opening, said first and second guide means having a guide surface running from adjacent said first end of said opening to adjacent said second end of said opening, third guide means mounted on said wall, said third guide means having a guide surface running from adjacent a central portion of said second end of said opening to a spaced distance from said opening, said guide surface of said third guide means having an inwardly directed portion adjacent said opening, door means for registering with and closing said opening, said door means having a first end and a second end, said door means having first and second follower means mounted on opposite sides thereof adjacent said first end for respective sliding engagement with the guide surfaces of said first and second guide means, said door means having third follower means mounted adjacent said second end thereof for sliding engagement with the guide surface of said third guide means, said first, second and third follower means for supporting said door means for endwise movement relative to said opening along the guide surfaces of said first, second and third guide means, said first and second follower means being so constructed to cooperate with the guide surfaces of said first and second guide means to move said first end of said door means inwardly relative to said wall as said door means is moved endwise relative to said opening, said third follower means having sapced members thereon engaging said third guide means and so constructed to cooperate with the inwardly directed portion of the guide surface of said third guide means to move said third follower means inwardly as it moves endwise away from said second end along said third guide means, and thereby to move said second end of said door inwardly through an arcuate path to clear said wall as said door means is moved endwise along said guide means.

5. The combination of claim 4 wherein the guide surfaces of said first and second guide means have inwardly directed arcuate portions adjacent the first end of said opening, said first and second follower means having spaced members thereon slidably engaging respective ones of said first and second guide means and so constructed to cooperate with said inwardly directed arcuate portions to move said first end of said door inwardly through an arcuate path as said door means is moved endwise along said guide surfaces.

6. The combination of claim 5 wherein said first follower means comprises a first arm pivotally attached to the first end of said door means, said first arm having spaced followers rotatably mounted thereon, said followers slidably engaging the guide surface of said first guide means, wherein said second follower means comprises a second arm pivotally attached to the first end of said door means, said second arm having spaced followers rotatably mounted thereon, said followers slidably engaging the guide surfaces of said second guide means, and wherein said third follower means comprises a third arm pivotally attached to the central portion of the second end of said door means, said third arm having spaced followers rotatably mounted thereon, said followers slidably engaging the guide surface of said third guide means, and power means operatively connected to said third arm to move said door means along said guide means.

7. The combination of claim 6 further comprising:
latch means connected to said wall for operatively engaging with means on the upper portion of said door means to hold said door means in a closed position.

8. The combination of claim 6 wherein said power means comprises:
fourth guide means mounted on said wall and aligned with and spaced from said third guide means, said fourth guide means having a guide surface,
fourth follower means slidably engaging the guide surface of said fourth guide means, said fourth follower means being operatively connected to said third arm to move said third arm along said third guide means when said fourth follower means is moved,
a continuous flexible driven member mounted on said wall structure and mounted for traverse about an idler wheel adjacent one end of said fourth guide means and a driven wheel adjacent the other end of said fourth guide means, said flexible driven member being operatively connected to said fourth follower means for causing it to traverse the guide surface of said fourth guide means, and
means for rotatably driving said driven wheel.

9. A door operating mechanism for an access opening in an airframe having inner and outer skins, said opening formed through the inner and outer skins of said airframe, said airframe including a door frame between said skins for supporting said mechanism, comprising:
a first track means mounted on one side of said door frame and defining a first guideway running along said one side of said door frame,
a second track means mounted on the opposite side of said door frame and defining a second guideway running along said opposite side of said door frame,
a third track means mounted adjacent a third side of said door frame and defining a third guideway having one end thereof substantially centered adjacent said third side, said third guideway extending away from said third side along a path generally parallel to said first and second guideways, a portion of said third guideway adjacent said opening extending inwardly from said outer skin,
a door means oriented for disposition across said access opening, said door means having first, second and third follower means thereon associated respectively with said first, second and third guideways, said first and second follower means mounted on respectively opposite sides of said door means adjacent one end thereof, said third follower means mounted adjacent the other end of said door means and located centrally of said other end, each of said follower means comprising an arm pivotally attached to said door means and two guided members mounted on each of said arms, said guided members being spaced from each other and the pivotal connection of said arms to said door, said guided members slidably engaging and being guided for traverse by a respective guideway, said third follower means so constructed to cooperate with said third track means to move said door means inwardly as said guided members of said third follower means traverse said portion of said third guideway, and
means connected to one of said follower means for moving said guided members in traverse of said guideways to open and close said door means.

10. The door mechanism of claim 9 wherein each of said guideways have a first portion located adjacent said outer skin in which said guided members rest when said door means is disposed across said opening, a second portion adjoining said first portion which is directed inwardly toward said inner skin, and a third portion adjoining said second portion adjacent said inner skin, said third portion being elongate and generally following the curvature of said inner skin, said third portion being sufficiently elongate to guide said door means to a position out of registration with said opening.

11. The door mechanism of claim 10 wherein said means for moving said guided members comprises:
a fourth track means mounted adjacent said third track means and defining a fourth guideway having a guide path generally the same as the third portion of said third guideway,
a fourth follower means mating with said fourth guideway, said fourth means connected to said third follower means, and
means for driving said fourth follower means in traverse of said fourth guideway for opening and closing said door means.

12. The door mechanism of claim 11 wherein said first portions of said first and second guideways are located adjacent the bottom of said opening, and wherein said first portion of said third guideway is located centrally adjacent the top of said opening.

13. The door mechanism of claim 12 wherein said means for driving said fourth follower means comprises a link chain mounted for traverse about first and second sprockets, said first sprocket located adjacent the first portion of said third guideway, said second sprocket located adjacent the upper end of said third portion of said third guideway, at least one link on said chain attached to said fourth follower means, and reversible motor means for rotatably driving one of said first and second sprockets.

* * * * *